US011386337B2

(12) United States Patent
Baughman et al.

(10) Patent No.: US 11,386,337 B2
(45) Date of Patent: Jul. 12, 2022

(54) MODELING A CORRELATION AND A CAUSATION LINK OF HIDDEN EVIDENCE

(71) Applicant: International Business Machines Corporation, Armonk, NY (US)

(72) Inventors: Aaron Keith Baughman, Silver Spring, MD (US); Bridget Briana Beamon, Cedar Park, TX (US); Dong Chen, State College, PA (US); Peter Kenneth Malkin, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 607 days.

(21) Appl. No.: 16/417,924

(22) Filed: May 21, 2019

(65) Prior Publication Data

US 2019/0272469 A1 Sep. 5, 2019

Related U.S. Application Data

(63) Continuation of application No. 14/944,853, filed on Nov. 18, 2015, now Pat. No. 10,410,123.

(51) Int. Cl.
*G06N 5/02* (2006.01)

(52) U.S. Cl.
CPC ................... *G06N 5/022* (2013.01)

(58) Field of Classification Search
None
See application file for complete search history.

(56) References Cited

U.S. PATENT DOCUMENTS

2009/0006313 A1 1/2009 Liu et al.
2010/0023307 A1* 1/2010 Lee .................. G06K 9/6226
703/7

(Continued)

FOREIGN PATENT DOCUMENTS

GB         2464677 A       4/2010
WO    WO 03/088587 A1    10/2003
(Continued)

OTHER PUBLICATIONS

Cerna et al., The Fundamentals of FFT-Based Signal Analysis and Measurement, National Instruments, Application Note 041, Jul. 2000, Total pages: 20 (Year: 2000).*

(Continued)

*Primary Examiner* — Alan Chen
(74) *Attorney, Agent, or Firm* — Peter Edwards, Esq.; McGinn I.P. Law Group, PLLC.

(57) ABSTRACT

A method, system, and non-transitory compute readable medium for hidden evidence correlation and causation linking including a forecasting device configured to forecast hidden evidence found in relation to a user input in hidden cycle measurements into future forecasted cycle measurements, where the forecasted hidden cycles are transformed into an amplitude versus frequency histogram with each histogram being compared to each other histogram and determined if causation is a candidate, and if causation is a candidate, a probability density function is applied to produce a degree of causation of a causation link for the hidden evidence in relation to the user input.

13 Claims, 5 Drawing Sheets

HIDDEN EVIDENCE CORRELATION AND CAUSATION LINKING METHOD 200

(56) References Cited

U.S. PATENT DOCUMENTS

| | | |
|---|---|---|
| 2010/0030761 A1 | 2/2010 | Zhao |
| 2010/0082511 A1 | 4/2010 | Niu et al. |
| 2011/0238613 A1 | 9/2011 | Shehory et al. |
| 2011/0320388 A1 | 12/2011 | Wong et al. |
| 2014/0089237 A1 | 3/2014 | Adibi |

FOREIGN PATENT DOCUMENTS

| | | |
|---|---|---|
| WO | WO 2007/143898 A1 | 12/2007 |
| WO | WO 2012/161387 A1 | 11/2012 |

OTHER PUBLICATIONS

United States Notice of Allowance dated May 2, 2019. in U.S. Appl. No. 14/944,853.
United States Office Action dated Nov. 14, 2018, in U.S. Appl. No. 14/944,853.
Mel, et al. "The NIST Definition of Cloud Computing". Recommendations of the National Institute of Standards and Technology. Nov. 16, 2015.
Wang, Can, et al;. "Coupled clustering ensemble: Incorporating coupling relationships both between base clusterings and objects" In Data Engineering (ICDE), 2013 IEEE 29th International Conference on, pp. 374-385. IEEE, 2013.
Taniguchi, Tsuyoshi, et al; "Discovery of hidden correlations in a local transaction database based on differences of correlations." In Machine Learning and Data Mining in Pattern Recognition, pp. 537-548. Springer Berlin Heidelberg, 2005.

\* cited by examiner

HIDDEN EVIDENCE CORRELATION AND CAUSATION LINKING METHOD 200

MODELING A CORRELATION AND A CAUSATION LINK OF HIDDEN EVIDENCE

CROSS-REFERENCE TO RELATED APPLICATIONS

The present application is a Continuation Application of U.S. patent application Ser. No. 14/944,853, filed on Nov. 18, 2015, the entire contents of which are hereby incorporated by reference.

BACKGROUND

The present invention relates generally to analyzing a given data set and finding hidden relationships amongst the data, and more particularly, but not by way of limitation, to modeling a correlation and a causation link of hidden evidence.

Conventional techniques support decision-making by identifying and exploiting patterns hidden in complex data and can operate in a forensic mode against historical data, near real-time mode for proactive decision-making, or any combination thereof. Fusion algorithms and techniques are applied to observation data that may only partially satisfy an event description in time, space, or other relevant dimensions. Using context propagation, Bayesian reasoning, and spatiotemporal analysis, the conventional techniques provide predictive awareness of upcoming events and likelihood analysis for events that may have already occurred, but were not evident in the collected data, while at the same time minimizing false detections. However, such techniques fail to identify a causation of the events.

Other conventional techniques are directed to improving information retrieval effectiveness by dynamically combining evidence information produced by a plurality of retrieval systems matching alternative representations of queries and documents. The user enters a query and the system generates alternative representations of the query. The techniques also maintain a collection of documents and corresponding alternative representations of the documents. The techniques then perform matching between the alternative representations of the query and the corresponding alternative representations of the documents and generates individual matching scores for the alternative representation matches. Correlation information is also determined for the individual scores. However, the causation of the hidden evidence is not calculated in the conventional techniques.

Thus, there is a technical problem in the conventional techniques that the techniques do not consider the causation of the hidden evidence such that there is no explanation behind retrieved evidence and a particular question.

SUMMARY

In an exemplary embodiment, the present invention can provide a hidden evidence correlation and causation linking system, the system including a correlation computing device configured to compute a correlation link based on hidden evidence found in relation to a user input in hidden cycle measurements, a forecasting device configured to forecast the hidden evidence into future forecasted cycle measurements, and a causation computing device configured to compute a causation link based on the future forecasted cycle measurements.

Further, in another exemplary embodiment, the present invention can provide a non-transitory computer-readable recording medium recording a program for hidden evidence correlation and causation linking, the program causing a computer to perform: computing a correlation link based on hidden evidence found in relation to a user input in hidden cycle measurements, forecasting the hidden evidence into future forecasted cycle measurements, and computing a causation link based on the future forecasted cycle measurements.

Even further, in another exemplary embodiment, the present invention can provide a hidden evidence correlation and causation linking method, the method including computing a correlation link based on hidden evidence found in relation to a user input in hidden cycle measurements, forecasting the hidden evidence into future forecasted cycle measurements, and computing a causation link based on the future forecasted cycle measurements.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION

Figure 1:
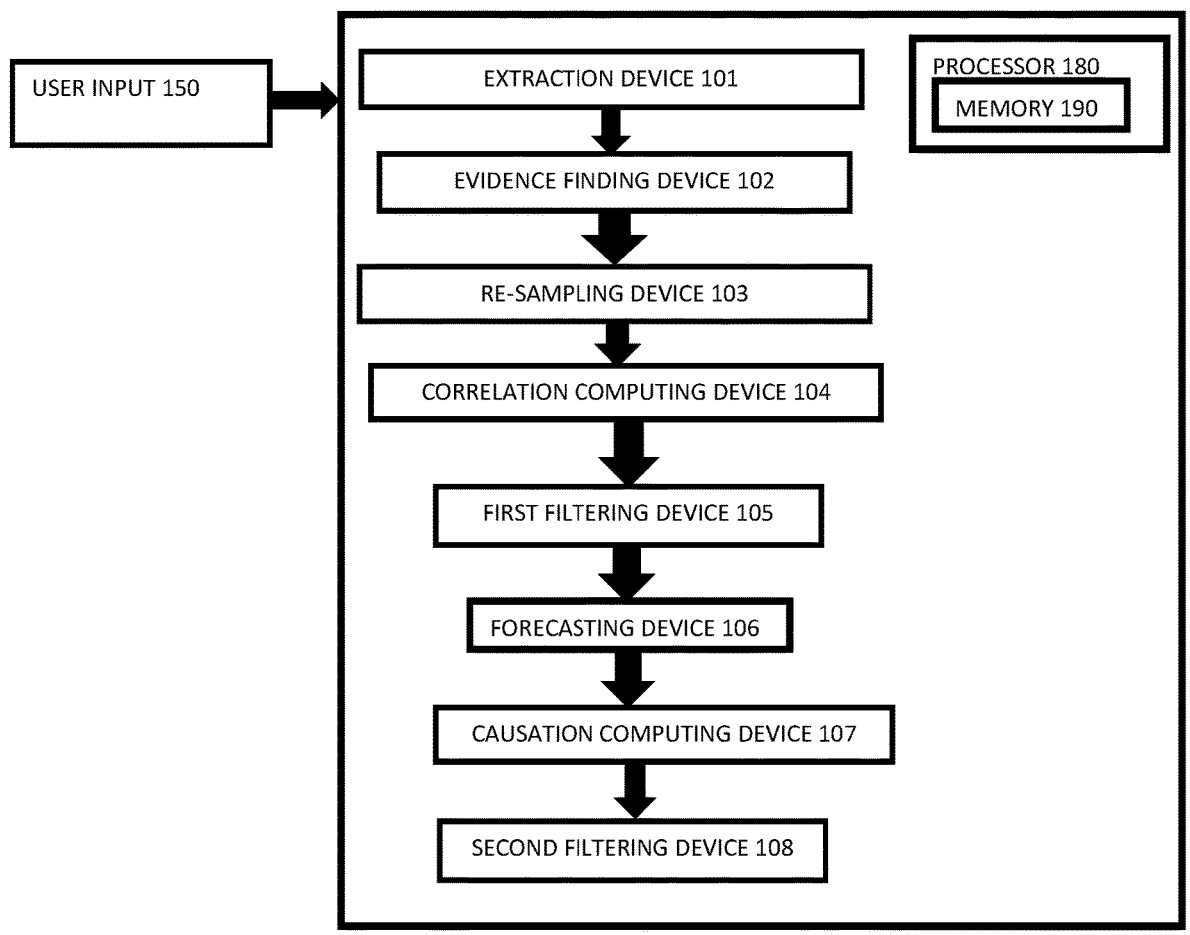
FIG. 1 exemplarily shows a block diagram illustrating a configuration of a hidden evidence correlation and causation linking system 100.

The invention will now be described with reference to FIGS. 1-5, in which like reference numerals refer to like parts throughout. It is emphasized that, according to common practice, the various features of the drawing are not necessary to scale. On the contrary, the dimensions of the various features can be arbitrarily expanded or reduced for clarity. Exemplary embodiments are provided below for illustration purposes and do not limit the claims.

With reference now to FIG. 1, the hidden evidence correlation and causation linking system 100 includes an extraction device 101, an evidence finding device 102, a re-sampling device 103, a correlation computing device 104, a first filtering device 105, a forecasting device 106, a causation computing device 107, and a second filtering device 108. The hidden evidence correlation and causation linking system 100 receives a user input 150 as an input based on a question or data that the user would like to find a correlation and causation of. The hidden evidence correlation and causation linking system 100 includes a processor 180 and a memory 190, with the memory 190 storing instructions to cause the processor 180 to execute each device of the hidden evidence correlation and causation linking system 100.

Although the cognitive publication subscriber system 100 includes various devices, it should be noted that a cognitive publication subscriber system can include modules in which the memory 190 stores instructions to cause the processor 180 to execute each module of the hidden evidence correlation and causation linking system 100.

Figure 3:
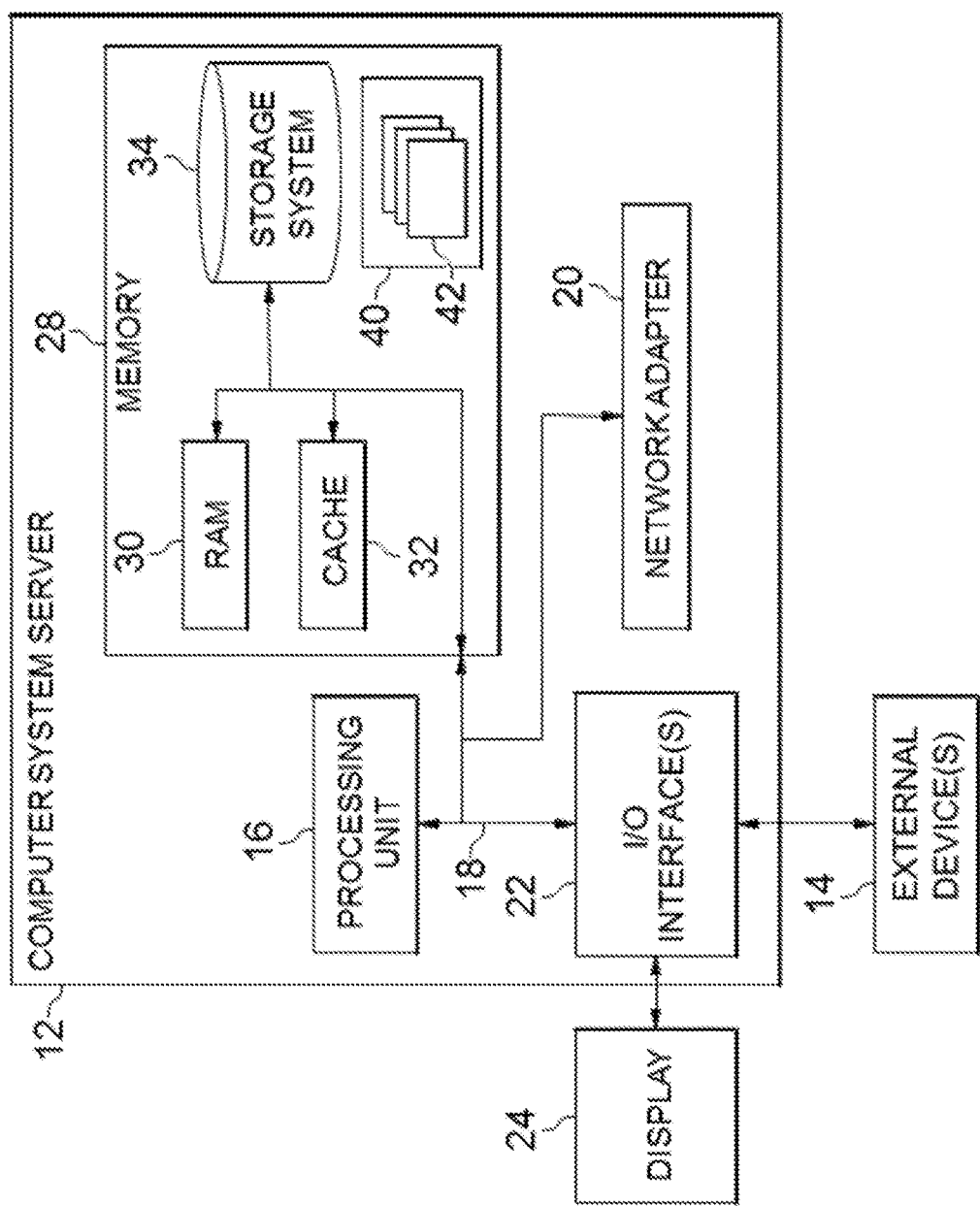
FIG. 3 depicts a cloud computing node according to an embodiment of the present invention.
Figure 4:
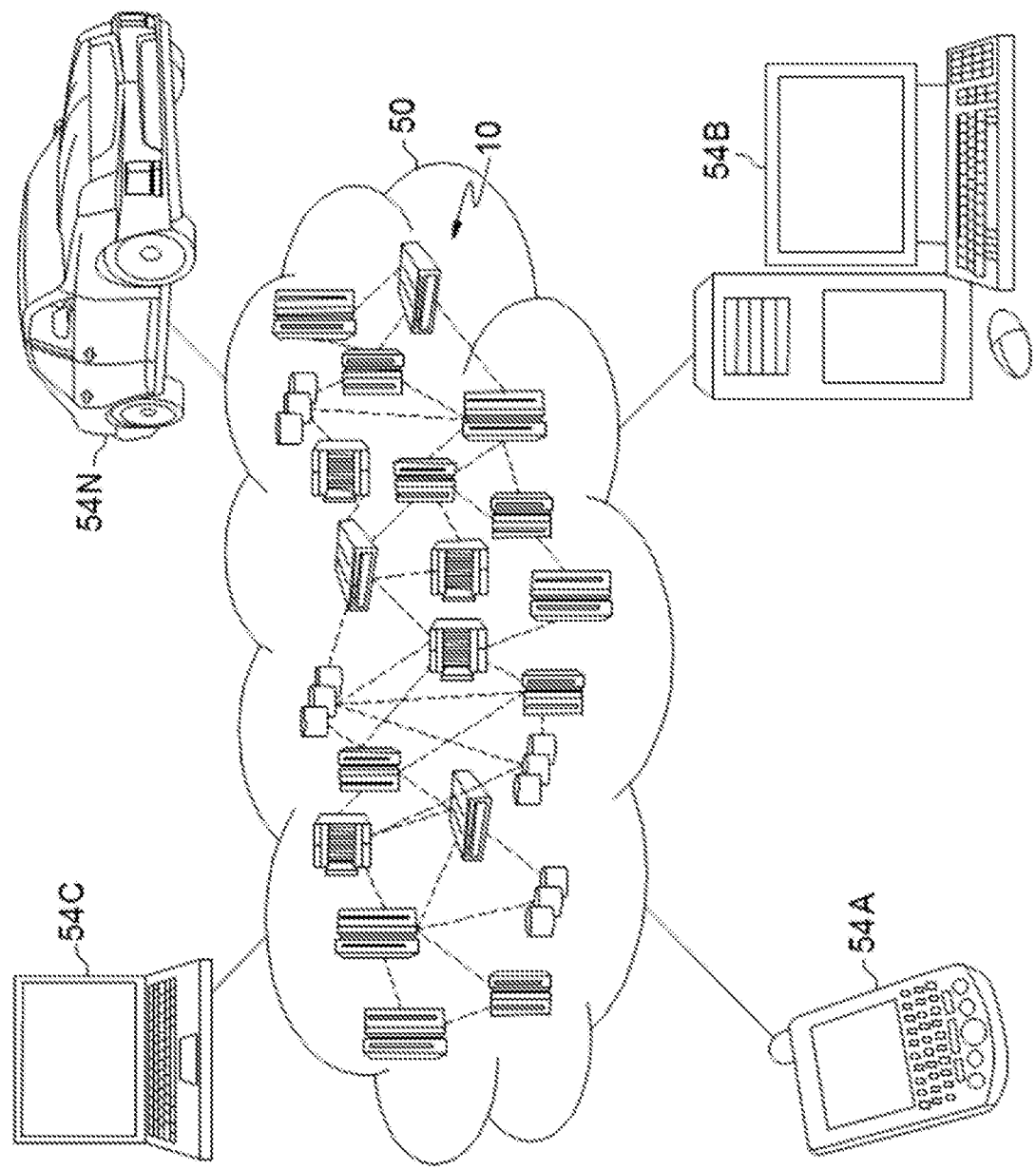
FIG. 4 depicts a cloud computing environment according to another embodiment of the present invention.
Figure 5:
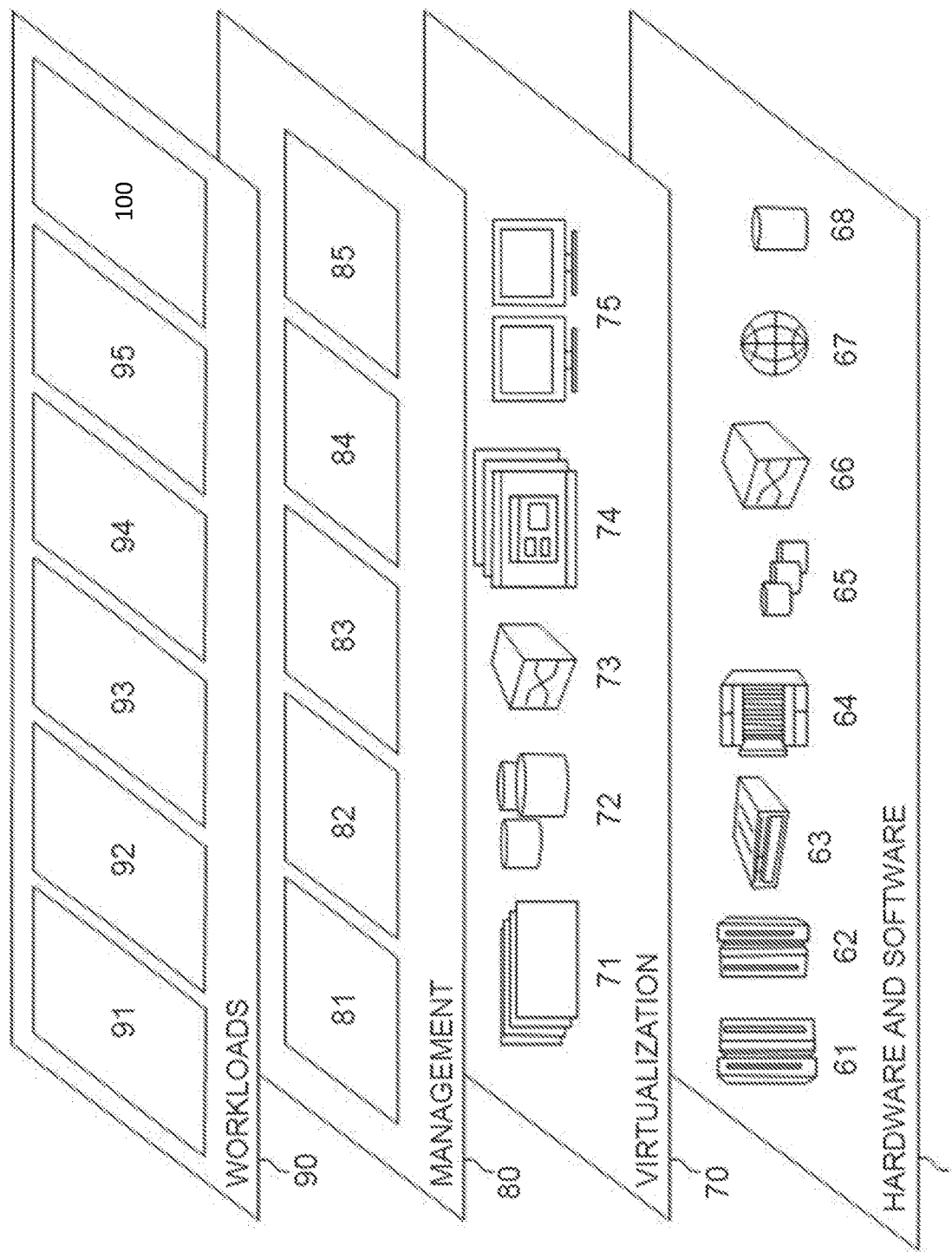
FIG. 5 depicts abstraction model layers according to an embodiment of the present invention.

Although as shown in FIGS. 3-5 and as described later, the computer system/server 12 is exemplarily shown in cloud computing node 10 as a general-purpose computing device which may execute in a layer the hidden evidence correlation and causation linking systems 100 (FIG. 5), it is noted that the present invention can be implemented outside of the cloud environment.

The extraction device 101, for a given time domain, extracts the temporal relations with a topic based on the user input 150 from a large corpus of data. It should be noted that the user can input multiple user inputs 150 so as to extract multiple temporal relations based on the multiple user inputs 150.

The extraction device 101 converts the temporal relations to a time versus frequency graph by using a Fast Fourier Transform (FFT).

The evidence finding device 102 finds evidence based on the temporal relations from the extraction device 101 (i.e., based on the time versus frequency graph). After finding the evidence, the evidence finding device 102 determines a principal time series component. The principle time series component can be, for example, the highest amplitude of the time axis.

The re-sampling device 103 re-samples the temporal relations to find hidden evidence based on the principle time series component. That is, hidden evidence is a re-sampled piece of evidence from a principal time series component.

For example, if the user input 150 is "How often does a golfer practice his mid-shots?", and the evidence finding device 102 determines that the principle time series component is every 5 hours, then the principal time series component is set to 5 hours.

Then, the re-sampling device 103 re-samples all of the evidence found by the evidence finding device 102 to determine all the user input questions based on the principal time series component. That is, each user input 150 is re-sampled based on the principal time series component (i.e., 5 hours) to determine hidden evidence between each of the user inputs 150.

The correlation computing device 104 computes the correlation between the hidden evidence for each user input 150. The correlation computing device 104 computes a correlation link based on hidden evidence found in relation to the user input 150 in hidden cycle measurements by the re-sampling device 103.

Based on the calculated correlations, the forecasting device 106 forecasts the correlations into the future by extrapolating the correlated data into future data of a time versus frequency graph (i.e., a forecast band). In other words, the forecasting device 106 forecasts the hidden evidence into future forecasted cycle measurements.

The causation computing device 107 overlays all the forecast bands to compute a causation of the user input, with a confidence factor. That is to say, the causation computing device 107 computes a causation link based on the future forecasted cycle measurements.

For example, if the evidence is re-sampled at a 5 hour principle time series and the correlation computing device 104 finds that fix every 5 hours of mid-shot practice that the golfer injures his wrist, wins if he practices mid-shots every 5 hours, and doesn't perform any extra-curricular activity detrimental to his game, the causation computing device 107 overlays each of those correlations which are extrapolated and forecasted into the future by the forecasting device 106, and computes the causation, with confidence, that practicing mid-shots every 5 hours causes each of the correlations.

An output of the causation computing device 107 can be that if the golfer practices his mid-shot every 5 hours (i.e., the principal time series), he wins 70% of the time, injures his wrist 20% of the time, and does not perform extra-curricular activities detrimental to his game 85% of the time.

In other words, the hidden evidence correlation and causation linking system 100 determines a correlation of hidden evidence based on a particular user inputs) 150 and then computes the causation of each of the hidden evidence.

That is, many relationships between user input(s) 150 are hidden within temporal cycles that can be extracted by the extraction device 101. When hidden temporal hidden cycles are discovered, many relationships between topics can be discovered (i.e., evidence found by the evidence finding device 102). The evidence is re-sampled by the re-sampling device 103 to find hidden evidence and the correlation computing device 104 summarizes a correlation link between all hidden cycle links between a number of user inputs(s) 150. Further, a causation probability is computed by the causation computing device 107 if one topic caused the relationship to the other topic based on extrapolating the hidden evidence to forecast future events by the forecasting device 106.

More plainly stated, the hidden evidence correlation and causation linking system finds hidden cycles from a topic over time by conversion using fast fourier transformation. An overall signal is reduced into hidden components that is transformed into an amplitude versus frequency histogram and forecasted cycles. The correlation link threshold is learned through supervised learning. Next, the forecasted hidden cycles are transformed into an amplitude versus frequency histogram. Each histogram is compared to each and determined if causation is a candidate and if so, a probability density function is applied to produce the degree of causation.

In addition to the above, the hidden evidence correlation and causation linking system 100 includes the first filtering device 105 to filter out false negatives of hidden evidence that is correlated to each other. The first filtering device 105 includes a first answer key associated with a high correlation and a low correlation between the hidden evidence.

For example, the first filtering device 105 finds a number of parameters to compare to the first answer key. The parameters include, but are not limited to, a difference between a maximum frequency and minimum frequency of the graphs (i.e., 500 hrtz for high correlation and 10 hrtz for low correlation), the minimum frequency (i.e., 50 hrtz for high correlation and 5 hrtz for low correlation), the maximum frequency (i.e., 1000 hrtz for high correlation and 200 hrtz for low correlation), a number of unique frequencies (i.e., 20 for high correlation and 2 for low correlation), a difference between a maximum amplitude and minimum amplitude of the graphs (i.e., 90 for high correlation and 8 for low correlation), the maximum amplitude (i.e., 190 for high correlation and 19 for low correlation), the minimum amplitude (i.e., 100 for high correlation and 11 for low correlation), and the number of unique amplitudes (i.e., 21 for high correlation and 3 for low correlation). The first answer key values are non-limiting and merely for exemplary purposes. The first answer key values can change depending on each user input 150.

In one embodiment the first filtering device 105 can use Recall Based Filtering to minimize false negatives, however, the invention is not limited to a specific type of filtering so long as the filtering minimizes the false negatives.

Based on a threshold value as compared to the answer key, the first filtering device 105 filters out the false negatives. For example, the initial threshold can be set at 80% of the first answer key values. However, based on the output, the threshold value can be trained to increase or decrease to further limit false negatives.

Further, the hidden evidence correlation and causation linking system 100 includes the second filtering device 107 to filter out false positives of hidden evidence that is determined to have a causation to each other. The second filtering device 107 includes a second answer key associated with a high correlation and a low correlation between the hidden evidence.

Based on a comparison with the second answer key, a causation score with training data is used to minimize false positives and includes semantic features.

For example, the second filtering device 107 finds a number of parameters to compare to the second answer key. The parameters include, but are not limited to, an entity type (i.e., a semantic feature found from the user input 150), a difference between a maximum frequency and minimum frequency of the graphs (i.e., 500 hrtz for high correlation and 10 hrtz for low correlation), the minimum frequency (i.e., 50 hrtz for high correlation and 5 hrtz for low correlation), the maximum frequency (i.e., 1000 hrtz for high correlation and 200 hrtz for low correlation), a number of unique frequencies (i.e., 20 for high correlation and 2 for low correlation), a difference between a maximum amplitude and minimum amplitude of the graphs 90 for high correlation and 8 for low correlation), the maximum amplitude (i.e., 190 for high correlation and 19 for low correlation), the minimum amplitude (i.e., 100 for high correlation and 11 for low correlation), and the number of unique amplitudes (i.e., 21 for high correlation and 3 for low correlation). The second answer key values are non-limiting and merely for exemplary purposes. The second answer key values can change depending on each user input 150.

In one embodiment the second filtering device 108 can use Precision Based Filtering to minimize false positives, however, the invention is not limited to a specific type of filtering so long as the filtering minimizes the false positives.

Based on the second filtering device 108 filtering the causation link computed by the causation computing device 107, the hidden evidence correlation and causation linking system 100 outputs correlation and causation links between the hidden evidence.

Figure 2:
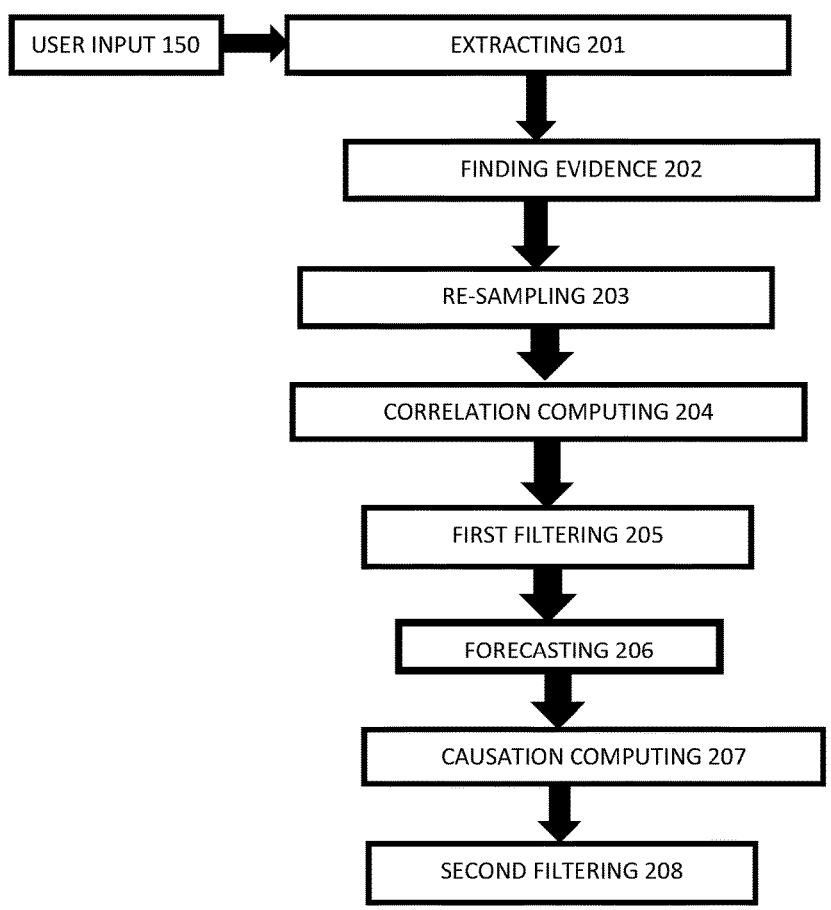
FIG. 2 exemplarily shows a high level flow chart for a hidden evidence correlation and causation linking method 200.

FIG. 2 shows a high level flow chart for a hidden evidence correlation and causation linking method 200.

Step 201 extracts the temporal relations with a topic based on the user input 150 from a large corpus of data.

Step 202 finds evidence based on the temporal relations from Step 201. After finding the evidence, Step 202 determines a principal time series component.

Step 203 re-samples all of the evidence found by Step 202 to determine all the user input questions based on the principal time series component. That is, each user input 150 is re-sampled based on the principal time series component to determine hidden evidence between each of the user inputs 150.

Step 204 computes a correlation between the hidden evidence for each user input 150.

Step 205 filters out false negatives of hidden evidence that is correlated to each other.

Step 206 forecasts the correlations into the future by extrapolating the correlated data into future data of a time versus frequency graph (i.e., a forecast band).

Step 207 overlays all the forecast bands to compute a causation of the user input, with a confidence factor.

Step 208 filters out false positives of hidden evidence that is determined to have a causation to each other.

In view of the foregoing and other problems, disadvantages, and drawbacks of the aforementioned background art, the disclosed invention above can provide a new and improved hidden evidence correlation and causation linking system which can calculate a correlation and a causation between a user input 150.

An exemplary aspect of the disclosed invention provides a system, method, and non-transitory recording medium for hidden evidence correlation and causation linking which can provide a technical solution to the technical problem in the conventional approaches in that the hidden evidence correlation and causation linking system, method, and non-transitory recording medium can analyze a given data set and find hidden relationships amongst the data, relationships which can then be used by a cognitive application (just like additional data). In addition, it can identify a cause for these relationship, thereby enabling a cognitive application to not only determine answers, but to also explain the causal reason for its answer to the user input. Many relationships between topics are hidden within temporal cycles that need to be extracted. When hidden temporal hidden cycles are discovered, many relationships between topics can be discovered. A correlation link summarizes all hidden cycle links between any number of topics. Further, a causation probability determines if one topic caused the relationship to the other topic. Any number can be measured together for joint causation. Thus, the system, method, and non-transitory recording medium for hidden evidence correlation and causation linking provides a technical solution to the technical problem in the conventional approaches by providing both a correlation and causation link of hidden evidence.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail), The consumer does not manage or control the underlying cloud infrastructure including network, servers, operating systems, storage, or even individual application capabilities, with the possible exception of limited user-specific application configuration settings.

Platform as a Service (Paas): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system'server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer MC, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the hidden evidence correlation and causation linking system 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A hidden evidence correlation and causation linking system, the system comprising:
   a forecasting device configured to forecast hidden evidence found in relation to a user input in hidden cycle measurements into future forecasted cycle measurements,
   wherein the forecasted hidden evidence is filtered,
   wherein forecasted hidden cycles are transformed into an amplitude versus frequency histogram with each histogram being compared to each other histogram and determined if causation is a candidate, and if causation is a candidate, a probability density function is applied to produce a degree of causation of a causation link for the hidden evidence in relation to the user input.

2. The hidden evidence correlation and causation linking system of claim 1, further comprising a causation computing device that overlays forecast bands to compute a causation of the user input, with a confidence factor.

3. The hidden evidence correlation and causation linking system of claim 1, further comprising a causation computing device that computes a causation link based on the future forecasted cycle measurements by overlaying forecast bands to compute a causation of the user input, with a confidence factor.

4. The hidden evidence correlation and causation linking system of claim 1, further comprising a first filtering device that performs the filtering to filter out false negatives of the hidden evidence that is correlated to each other by using a first answer key associated with a first correlation and a second correlation between the hidden evidence.

5. The hidden evidence correlation and causation linking system of claim 4, wherein a tolerance of the first filtering device is set based on a tolerance threshold value with respect to the first correlation and the second correlation between the hidden evidence.

6. The hidden evidence correlation and causation linking system of claim 5, further comprising a second filtering device that performs the filtering to filter out false positive of the hidden evidence based on the hidden evidence determined to have a causation to each other.

7. The hidden evidence correlation and causation linking system of claim 6, wherein the second filtering device includes a second answer key associated with a third correlation and a fourth correlation between the hidden evidence, and
   wherein a causation score with training data is used to minimize false positives and includes semantic features based on a comparison with the second answer key.

8. The hidden evidence correlation and causation linking system of claim 4, further comprising a second filtering device that performs the filtering to filter out false positive of the hidden evidence based on the hidden evidence determined to have a causation to each other.

9. The hidden evidence correlation and causation linking system of claim 8, wherein the second filtering device includes a second answer key associated with a third correlation and a fourth correlation between the hidden evidence, and
   wherein a causation score with training data is used to minimize false positives and includes semantic features based on a comparison with the second answer key.

10. The hidden evidence correlation and causation linking system of claim 1, further comprising a second filtering device that performs the filtering to filter out false positive of the hidden evidence based on the hidden evidence determined to have a causation to each other.

11. The hidden evidence correlation and causation linking system of claim 10, wherein the second filtering device includes a second answer key associated with a third correlation and a fourth correlation between the hidden evidence, and
    wherein a causation score with training data is used to minimize false positives and includes semantic features based on a comparison with the second answer key.

12. A non-transitory computer-readable recording medium recording a program for hidden evidence correlation and causation linking, the program causing a computer to perform:
    forecasting hidden evidence found in relation to a user input in hidden cycle measurements into future forecasted cycle measurements,
    wherein the forecasted hidden evidence is filtered,
    wherein forecasted hidden cycles are transformed into an amplitude versus frequency histogram with each histogram being compared to each other histogram and determined if causation is a candidate, and if causation is a candidate, a probability density function is applied to produce a degree of causation of a causation link for the hidden evidence in relation to the user input.

13. A hidden evidence correlation and causation linking method, the method comprising:
    forecasting hidden evidence found in relation to a user input in hidden cycle measurements into future forecasted cycle measurements,
    wherein the forecasted hidden evidence is filtered, and
    wherein forecasted hidden cycles are transformed into an amplitude versus frequency histogram with each histogram being compared to each other histogram and determined if causation is a candidate, and if causation is a candidate, a probability density function is applied to produce a degree of causation of a causation link for the hidden evidence in relation to the user input.

* * * * *